April 28, 1964     A. D. MITZELFELT     3,131,066
METHOD OF PREPARING A FILLED MEAT PRODUCT
Filed Jan. 13, 1961

INVENTOR
ALBERT D. MITZELFELT
BY Herbert A. Weinturn
ATTORNEY

United States Patent Office 3,131,066
Patented Apr. 28, 1964

3,131,066
METHOD OF PREPARING A FILLED MEAT PRODUCT
Albert D. Mitzelfelt, 1501 W. Taylor St., Kokomo, Ind.
Filed Jan. 13, 1961, Ser. No. 82,542
3 Claims. (Cl. 99—108)

This invention relates to a food product wherein there is, in the raw or uncooked state, a pair of complementary portions such as a top and a bottom molded to have each a central cavity, or in an alternative form to have a molded body with a planar cap or cover. Then the cavity formed between the upper and lower parts is designed to receive a relish, a salad, or a filler of some nature. The specific filler does not form a part of the invention per se, and neither does the exact perimeter shape. That is, the perimeter may lie in a circle, rectangle, or other selected contours.

After the filler has been placed in the cavity, and the upper and lower parts placed in registry one over the other, the combination is then ready to be cooked, whereupon in the cooking process, the two parts become in effect integral one with the other. That is, the resultant product is a sealed unit without any covering skin and having an internal cavity filled with a desired dressing. Any such dressing may be employed as above indicated, to which could be added mustard, a tomato preparation and the like.

It is an important object of the invention to provide a product in the absence of any casing to be handled initially either in a frozen state wherein the top and bottom portions may be separately stacked and delivered to the points where they are to be assembled and sold, or in an assembled, pre-cooked form, frozen or unfrozen, for further heating. The product is designed to permit the dispensing operator to use the filling desired by the customer and then cook the unit so filled so that it may be served hot. All of this eliminates the heretofore necessity of having to cook meat in the form of hamburgers or frankfurters either with skins to be removed or left intact, and then fill around the hamburger or frankfurter in a bun the desired relish or filling, this procedure involving a rather messy product particularly when the purchaser starts to eat it. Also by reason of my invention, there is a fixed amount of the filler accompanying each cooked product.

Further advantages are had in that the invention eliminates the necessity of special buns by being able to be served on any standard sandwich bun, bread or the like; reduces inventory and preparation of special sauces, fillings, bases, by being manufactured or processed with sauces, bases, and fillings; reduces labor costs of preparing for consumption by having sauces, bases, fillings, etc., contained within eliminating the necessity of preparing and applying after cooking; provides a final cooked product with heated sauces, bases, fillings, etc., in one operation; the product can be packaged in standard containers either plain or complete with selected sauces, bases and fillings; the product can be deep fat cooked, grilled, broiled, boiled, or baked without losing natural juices or flavors; provides unlimited possibilities for combinations of vegetables, sauces, meat bases, jellies, cheeses, fillings to be filled with and cooked within; and will provide a cooked meat product that will be impregnated with the flavors of the sauces, bases, fillings, contained within.

These and many other objects and advantages of the invention will become apparent in the following description of the invention as described in reference to the accompanying drawing, in which FIG. 1 is a view in side elevation and partial section of a completed, cooked product;

Figure 1:
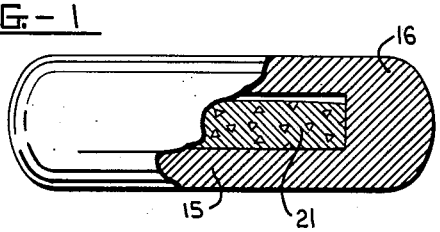
Figure 2:
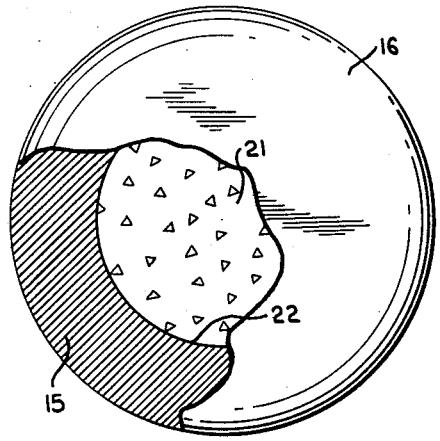
FIG. 2 is a top plan view of the product in partial section.
Figure 3:
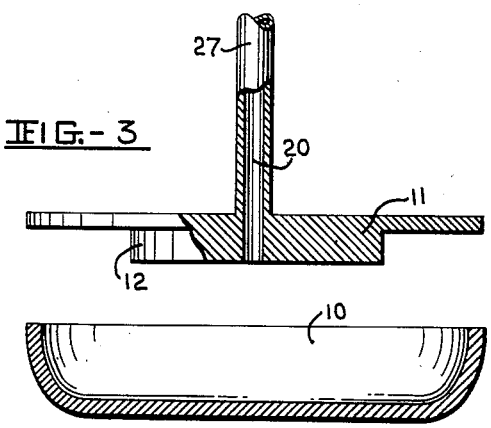
FIG. 3 is a vertical, disassociated view of a two member mold for shaping a product base.
Figure 5:
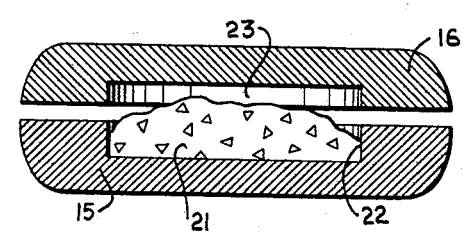
FIG. 5 is a view of the two molded portions with a filler in the lower portion prior to closing together of those two portions.
Figure 6:
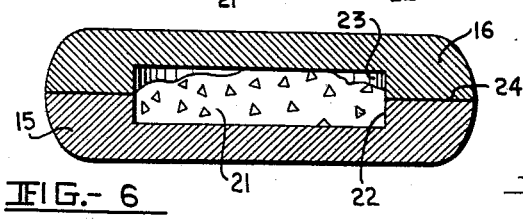
FIG. 6 is a view of the closed, molded top and bottom portions with the filler therebetween prior to cooking.

In forming the base portion, the particular meat product desired is placed within the lower mold cavity 10, FIG. 3, the quantity of which is predetermined so that when the upper mold portion 11 is brought down to bear around the periphery of the lower mold portion 10, the central downwardly extending portion 12 will come into contact with the meat product and force it outwardly and bring it to the top level of the mold portion 10 entirely around that central portion 12, thus forming the lower portion of the food product, 15, as illustrated in FIGS. 5 and 6. This meat product is in ground, raw form permitting ready molding.

Figure 4:
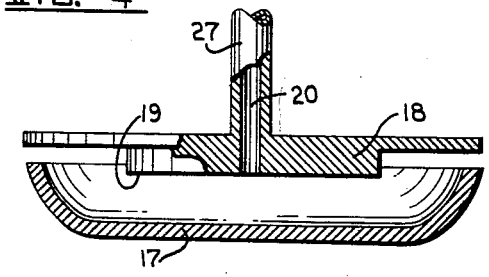
FIG. 4 is a view in vertical section of a two part mold for making the cap of the product.

Referring to FIG. 4, normally the upper food portion 16 is of less vertical thickness than is the lower portion 15, and here the lower portion 17 of the cap mold is shallower than is the mold portion 10. The upper mold portion 18 may be identical to the portion 11, although the central downwardly extending portion 19 of the upper mold 18 is preferably of less vertical thickness than is the thickness of the corresponding member 12, FIG. 3. The meat product is put into this cap mold portion 17 and the upper mold 18 brought down thereagainst to mold the cap 16, FIGS. 5 and 6.

An alternative way of placing the meat product in the molds is to inject it through a bore 20 in each instance, FIGS. 3 and 4, so that originally the upper mold members 11 and 18 rest against the peripheries of the lower mold portions 10 and 17. The meat product is provided in a rather stiff consistency so that it will stand up when removed from the molds, or it may be cooked while in the molds.

Prior to placing the top cap 16 over the base portion 15, the desired filler designated by the numeral 21 is placed within the cavity generally designated by the numeral 22 in each instance, but limited in quantity so that when the cap 16 is placed down in registry over the base portion 15, this filler 21 does not completely fill the entire volume of the combined cavity 22 of the base 15 and the cavity 23 of the cap 16. This limitation is made in order to prevent expansion of the filler 21 from completely filling the combined cavities 22 and 23 tending to lift or bulge or even separate the cap 16 from the lower body 15 in the cooking operation.

The cap 16 is pressed down firmly around its peripheral portion against the top peripheral portion of the lower portion 15 so that the two members, cap and base come together on a plane designated by the numeral 24. When these two members are simultaneously cooked together, the line of the plane 24 and any evidence of it disappears so that to all intents and purposes the cap 16 becomes an integral part of the base 15 due to the exchange of cooking juices and fats.

Figure 7:
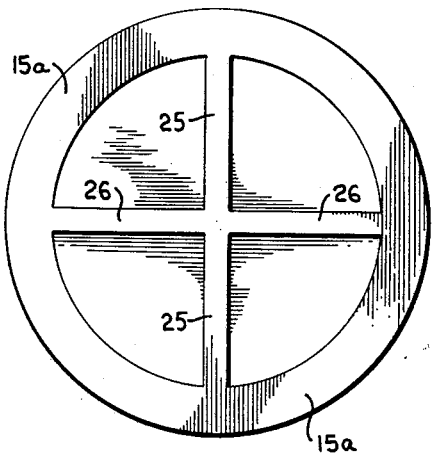
FIG. 7 is a top plan view of a bottom food portion showing a modified cavity divided into four separate areas.

Referring to FIG. 7, the lower base 15 may be formed to have the dividing crossed partitions 25 and 26. In this manner, four different relishes or fillers may be employed or the same filler may be placed in all four cavities. Normally a cap of the formation of the cap 16 would be placed over the base 15a, although it is conceivable that the base 15a with its cooked filler therein may be served without the cap.

I have not herein shown the mechanism for advancing one mold 11 to the other mold 10 or 18 to 17, inasmuch as that is not a part of the invention per se, and it is to be noted that the bore 20 is centered within a stem 18 which is a part of the die member 11 or 27.

While I have herein shown and described my invention in the one particular, precise form, it is obvious that variations may be employed without departing from the spirit of the invention, and I therefore do not desire to be limited to that exact form beyond the limitations which may be imposed by the following claims.

I claim:

1. The method of forming a food product which comprises molding a portion of raw ground meat into a base with a floor and a surrounding wall defining a cavity therebetween; placing a predetermined quantity of relish in said cavity; molding a portion of ground, raw meat into the form of a cap having a cavity in the underside thereof; and placing it across said wall and said cavity with the underside of the peripheral portion of the cap in registry and contact with the top side of said wall to cover the relish in said base cavity; and heating to a cooking temperature the resultant structure bonding them together by promoting an interexchange of juices and fats between the wall and the cap, effecting a resultant integral body enclosing said relish.

2. The method of claim 1, in which said cavity molded in the under side of said cap forms an extension therein from said base, into which said relish may expand during said heating.

3. A hollow, cooked ground meat product comprising a base having a floor and a surrounding upturned wall therearound defining a cavity in the base; a ground meat cap over the cavity and resting on said wall; and said cap and wall being integrally joined together by interchanged fats and juices of the meat.

References Cited in the file of this patent

UNITED STATES PATENTS

| | | |
|---|---|---|
| 1,596,652 | Giovannetti | Aug. 17, 1926 |
| 2,060,490 | Brobely | Nov. 10, 1936 |
| 2,156,145 | Cavett et al. | Apr. 25, 1939 |
| 2,855,305 | Cella | Oct. 7, 1958 |

OTHER REFERENCES

"Everybody's Cook Book," 1957, by I. E. Lord, published by Harcourt, Brace and Company, New York, page 112, article entitled Ravioli.